Sept. 5, 1944.  H. RAYMOND  2,357,764
CULINARY IMPLEMENT
Filed March 14, 1944
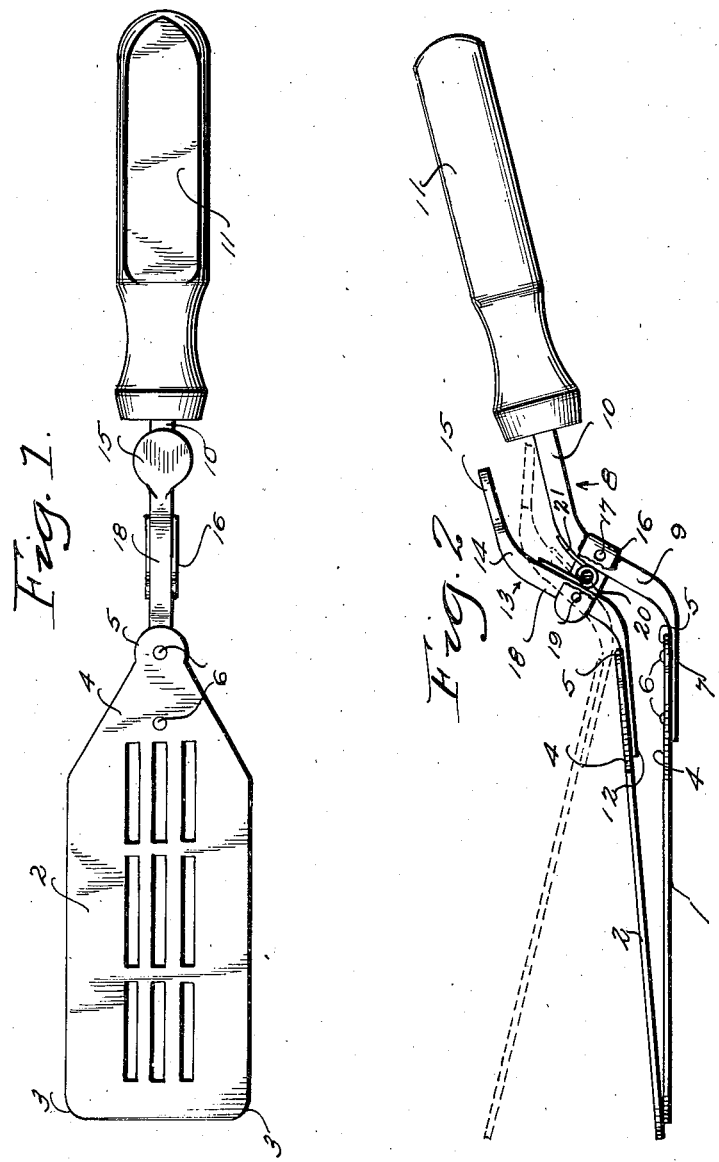
Inventor
Harry Raymond
By Clarence A. O'Brien
and Harvey B. Jacobson
Attorneys Patented Sept. 5, 1944

2,357,764

UNITED STATES PATENT OFFICE 2,357,764

CULINARY IMPLEMENT

Harry Raymond, Madison, N. J.

Application March 14, 1944, Serial No. 526,367

1 Claim. (Cl. 294—7)

My invention relates to improvements in culinary implements for use especially, although not necessarily, in turning articles of food in a frying pan, or on a griddle, the principal object in view being to provide an easily handled, simply constructed device of the spatular type with opposed clamping blades for holding food articles therebetween, when being turned, with variable pressure, as the case may require, and which are easily operative to release the articles of food and permit such articles to slide gently from between the blades into a pan, or the like, so as to obviate splashing hot grease and breaking up food in turning operations.

Another object is to provide an implement of the type and for the purposes above set forth which is also adapted for use as a single-bladed spatula in picking up articles of food from a pan or griddle, and which is inexpensive to manufacture.

Other and subordinate objects are also comprehended by my invention, all of which, together with the precise nature of my improvements, will be readily understood when the succeeding description and claim are read with reference to the drawing accompanying and forming part of this specification.

In said drawing:

Figure 1 is a view in plan of my improved culinary implement in its preferred embodiment; and Figure 2 is a view in side elevation with parts broken away and shown in section, the blades being shown closed in full line and the upper blade being open in dotted lines.

Referring to the drawing by numerals, my improved culinary implement, as illustrated, comprises a pair of lower and upper flat blades 1, 2, respectively, which, generally speaking, are of rod-like, elongated rectangular form with rounded front end corners 3 and tapering rear end portions 4 having rounded terminals 5.

The lower blade 1 has the rear end portion 4 and terminal 5 thereof riveted, as at 6, to the flattened straight front end 7 of a rod-like shank 8 provided with an intermediate straight portion 9 inclining upwardly and rearwardly from the end 7 and merging into a rear end shank portion 10 inclining upwardly and rearwardly from said portion 9 and suitably secured in the front end of an elongated hand grip 11.

The upper blade 2 has the rear end portion 4 and terminal 5 thereof secured in the same manner as the lower blade 1 on the front end 12 of a shank 13 similar in all respects to the shank 8 with the exception that the rear end portion 14 thereof terminates in a rounded flat thumb or finger piece 15.

The shank 13 of the upper blade 2 is pivotally mounted on the shank 8 above the latter and in spaced-apart relation thereto by means of a U-clip 16 spanning the intermediate portion 9 of the shank 8 and suitably secured to said portion, as by a pin 17, to extend forwardly from said portion, said clip 16 straddling the intermediate portion 18 of the shank 13, and said intermediate portion 18 being pivoted to said clip 16 by a transverse pivot pin 19.

Intermediate the shanks 8 and 13 is a coil spring 20 circumposed on a transverse stud 21 carried by the clip 16, the ends of said spring extending rearwardly and bearing against the shanks 8 and 13. As best shown in Figure 2, one end of the spring 20 bears against the rear side of the shank 13 in the rear of the pivot pin 19, whereby said shank 13 is urged in a direction to yieldingly maintain the upper blade 2 engaged with the lower blade 1 and said blades in closed clamping relation. As shown in Figure 2, in full lines, in the closed relation of the blades 1 and 2, said blades are engaged adjacent their front ends solely and whereby said blades may be opened, or separated, into substantially parallel, spaced-apart relation if desired. As also shown in said figure, in the fully closed relation of the blades 1 and 2, the upper blade 2 extends at its front end slightly beyond the front end of the lower blade, the advantage of which will presently appear.

In using the described implement, with the handle 11 grasped in one hand, the blades 1 and 2 may be separated, as desired, by pressure of the thumb of said hand or a finger thereof on the thumb piece 15 so that food in a pan may be picked up by the lower blade 1 and clamped between said blade by the action of the spring 20 under variable pressure which may be determined by the pressure exerted against the thumb piece 15. By a slight turn of the implement, the article of food may be turned over and by sufficient pressure on the thumb piece 15, the blades 1 and 2 may be opened and the article of food released to be slid off the blade 2 by proper tilting of the implement. By having the upper blade 2 extend beyond the lower blade 1, in the manner described, with said blades 1 and 2 in closed position, the upper blade 2 may be used as a single blade spatula for picking up food out of a pan or the like, if desired. As indicated in dotted lines in Figure 2, the thumb piece 15 is designed to engage the shank 8 and limit opening movement of the upper blade 2, and the thumb piece 15 is arranged directly in front of the handle 11 for convenience in operation by a thumb or finger of the hand grasping the handle 11.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claim.

What I claim is:

A culinary implement comprising an elongated hand grip, a rod-like shank extending from the front end of said hand grip, a flat grid-like blade attached to and extending forwardly from the front end of said shank, a second rod-like shank, means to pivotally mount the second shank intermediate its ends on the first-mentioned shank to extend alongside the same in spaced-apart relation thereto, a second blade similar to the first-mentioned blade extending from one end of the second-mentioned shank opposite the first-mentioned blade, the other end of the second-mentioned shank terminating in a thumb piece arranged forwardly of the hand grip, and a spring interposed between said shanks and exerting pressure against the second-mentioned shank in the rear of the pivot thereof, the means first mentioned comprising a U-clip straddling said shanks, and carrying a transverse stud to which said spring is anchored.

HARRY RAYMOND.